United States Patent
Cabas et al.

(10) Patent No.: US 9,206,790 B2
(45) Date of Patent: Dec. 8, 2015

(54) LINEAR ACTUATOR DEVICE

(71) Applicant: ARQUIMEA INGENIERIA, S.L., Leganes (Madrid) (ES)

(72) Inventors: Ramiro Cabas, Madrid (ES); Néstor Nava, Madrid (ES); Ramiro Mena, Madrid (ES); Marcelo Collado, Madrid (ES)

(73) Assignee: Arquimea Ingenieria, S.L.V., Madrid (ES)

( * ) Notice: Subject to any disclaimer, the term of this patent is extended or adjusted under 35 U.S.C. 154(b) by 367 days.

(21) Appl. No.: 13/662,840

(22) Filed: Oct. 29, 2012

(65) Prior Publication Data

US 2013/0104680 A1    May 2, 2013

(30) Foreign Application Priority Data

Oct. 28, 2011    (EP) .................................. 11382333

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F03G 7/06* | (2006.01) |
| *F16K 31/00* | (2006.01) |

(52) U.S. Cl.
CPC ................ *F03G 7/065* (2013.01); *F16K 31/00* (2013.01); *Y10T 74/18648* (2015.01)

(58) Field of Classification Search
CPC ................................ F03G 7/065; F16K 31/00
USPC ....................................................... 74/89.23
See application file for complete search history.

(56) References Cited

U.S. PATENT DOCUMENTS

| | | | |
|---|---|---|---|
| 5,771,742 A | 6/1998 | Bokaie et al. | |
| 6,029,686 A | 2/2000 | Pirkle | |
| 8,172,811 B2 * | 5/2012 | Roe ............................... | 604/207 |

(Continued)

FOREIGN PATENT DOCUMENTS

| | | |
|---|---|---|
| DE | 34 05 898 A1 | 8/1985 |
| DE | 19913048 A1 | 10/2000 |
| DE | 10231904 C1 | 11/2003 |

(Continued)

OTHER PUBLICATIONS

Extended European Search issued by the International Searching Authority (ISA/O.E.P.M.) on Mar. 15, 2012 in connection with International Application No. EP 11 38 2333.

*Primary Examiner* — William Kelleher
*Assistant Examiner* — Jake Cook
(74) *Attorney, Agent, or Firm* — Gary J. Gershik; Cooper & Dunham LLP

(57) ABSTRACT

The invention relates to a linear actuator device comprising a shaft (1) which can be displaced with respect to a casing (3), where said shaft (1) can be located in a first position in which it is actuated by elastic means (4), being maintained immobile by contact with a support element (5) which conveys its load to an intermediate element (6) which in turn conveys its load to an activating element (7); the shaft (1) being able to be located in a second position, in which the activating element (7) is rotated with respect to its position in the first position, such that said intermediate element (6) is housed in a housing (8) which the activating element (7) has, which allows displacing the support element (5) such that the shaft (1) is not in contact with said support element (5).

15 Claims, 15 Drawing Sheets

(56) References Cited

U.S. PATENT DOCUMENTS

2007/0028964 A1* 2/2007 Vasquez et al. .............. 137/457
2010/0050712 A1   3/2010 Tong et al.

FOREIGN PATENT DOCUMENTS

EP   0 145 828 A2   6/1985
EP   2 587 057 A1   5/2013

* cited by examiner

LINEAR ACTUATOR DEVICE

This application claims priority of European patent application No. 11382333.0, filed Oct. 28, 2011.

TECHNICAL FIELD OF THE INVENTION

The present invention relates to a linear actuator device, applicable in the industry of actuator mechanisms for remotely retaining and deploying elements and appendages, and more specifically in the area of actuators based on non-explosive technologies, allowing the remote deployment of appendages for their application in different sectors, such as the space, aeronautical, industrial or automotive sector, by means of a compact device taking up minimum space.

BACKGROUND OF THE INVENTION

A number of actuator devices typically referred to depending on the actuation direction, such as pin pullers or pin pushers, which are usually custom-made devices, depending on their application, being formed as a passive system which allows initiating an event by means of displacing a shaft or pin, are known today.

Explosive or pyrotechnic devices, also referred to as drives, which have been widely used for different functions in the aerospace field given their minimum volume/weight ratio, having instantaneous on-demand operation, and requiring little power for supplying them, furthermore being self-contained, are known in the field of these devices. For activation, these devices comprise an initiating material, which is heated until reaching self-ignition. The explosive devices perform functions of releasing, cutting, pressurizing, using in valves, igniting, using in switches and other applications in which mechanical work is required. They further allow long-term storage, are highly reliable, relatively inexpensive and power supply is limited compared with the power they can provide.

However, their drawbacks include the fact that they can only be used once, making the device testing phase complicated given that after each activation the explosive elements must be replaced. On the other hand, these actuators present handling, storage and maintenance problems in addition to containing hazardous and unstable materials, producing pollution and having high impact and vibration levels given their explosive and mechanical nature, making them incompatible in high-precision applications. All these operating and safety characteristics as well as new technology availability issues today question their use in future space missions.

On the other hand, in contrast with the aforementioned devices there are non-explosive actuator devices which have the main advantage that they can usually be reinitiated for reuse and they do not incorporate hazardous materials, although their volume/weight ratio and cost are greater than those of explosive actuator devices. Nevertheless, given their safety conditions, non-explosive actuator devices are widely used today for space applications, such as in satellites for example. However, with respect to pyrotechnic devices, non-explosive actuators do not require being as robust and can usually be simpler devices.

Some of the non-explosive actuator devices existing today are explained below.

Paraffin actuators use the high pressure produced by the volumetric expansion of paraffin when there is a solid phase to liquid phase transition (molten paraffin) to produce mechanical work in the form of the linear displacement of a piston. They are small-sized devices considering the force and the stroke, or displacement of an actuator pin or shaft, which they allow. The work is generated by the heat produced by internal electric resistance elements or even by room temperature gradients for the purpose of producing said phase change, no they are extremely sensitive to environmental conditions and their calibration can be complex in precision applications, making them more expensive.

Actuators commonly referred to as burn wire are based on the rapid heating of a wire which in turn releases a spring-operated mechanism. When a current is applied to the wire, the resistance to heating produces an increase of the temperature of the wire until it approaches melting and it breaks, such that by selecting the spring and other elements it is controlled that it breaks with a specific electric current. The main drawback of these devices is that the current for melting a long wire is very high, usually exceeding the available capacity in aircraft power systems in addition to it not being a reusable device.

Electromagnetic actuators have an optimal ratio between the force they can provide and their mass, consuming energy only during their actuation, in addition to allowing multiple actuations and having a modular construction; however, despite allowing a long stroke, they have little force.

Unlike electromagnetic actuators, piezoelectric actuators allow a short stroke and have a lot of force. These actuators are very fast, require high voltages and are very precise, therefore they have high repeatability, returning to their rest position when the electric action activating them no longer exists. Furthermore, these actuators are operative in a broad temperature range, which allows their use primarily in aerospace applications. However, even though these actuators can develop high stresses, of the order of 10-40 MPa, their displacement is relatively low, of the order of nanometers, greatly limiting their use in specific applications.

Finally, there are actuators commonly known by their abbreviations, such as SMA (i.e., shape memory alloy). An example of such actuators is described in U.S. Pat. No. 5,771, 742-A, where said SMA is used as an activating element to trigger the operation of the movable element or pin of the device. Compared with the remaining actuators, actuator devices incorporating SMA have better performance in terms of force considering their weight and volume. However, actuators based on SMA technology which are currently on the market have limitations for actuation at high temperatures.

Among non-explosive actuator devices, in addition to the drawbacks and limitations described in the preceding paragraphs for each type of device, there is a series of limitations concerning their field of application. In this sense, some devices are restricted to very limited force and movement ranges or consume a great deal of power. On the other hand, there are devices having large dimensions, which also limit their application. Others, such as electromagnetic devices, have considerable weight. There are those which generate and are sensitive to electromagnetic noise, making their application in noisy environments or in environments where electromagnetic disturbances should not be generated difficult, whereas some are only operative in a temperature range limited to environments under 90° C., which prevents their use in the space, aeronautic or automotive sectors, where higher operating temperatures are often required.

There is no device today in which different variables are simultaneously optimized relating to volume, degree of technical complexity, cost, precision, reliability, versatility concerning its applications and actuation capacity or available stroke. Likewise, one of the main limitations of devices today is the operating temperature range, which has maximum temperature values that could be low for certain applications, mainly in the aerospace field.

DESCRIPTION OF THE INVENTION

The present invention relates to a linear actuator device which allows remotely retaining and deploying elements in the field of non-explosive actuators, by means of a compact device taking up a minimum space.

The linear actuator device proposed by the invention comprises a shaft or pin which is aligned according to an axial direction, where said shaft can be displaced with respect to a casing. The shaft is housed at least partially in said casing, said displacement being performed by actuating elastic means.

According to the invention, the shaft can be located in a first position in which it is actuated by the elastic means, being maintained immobile in said first position by the contact between said shaft and at least one support element which conveys its load to at least one intermediate element which in turn conveys its load to an activating element according to a direction parallel to the axial direction.

The shaft can also be located in a second position in which the activating element is rotated with respect to the axial direction with respect to the casing, with respect to its position in the first position of the shaft, such that said at least one intermediate element is housed in a housing which the activating element has, allowing the displacement of said at least one support element such that the shaft is not in contact with said at least one support element.

The device of the invention thus allows providing a compact device taking up minimum space, while at the same time being highly reliable and light weight, assuring the remote retention and deployment of elements and appendages. With a minimum number of elements and a simple arrangement, the device of the invention allows simultaneously optimizing different design variables involved in the behavior and performance of these devices, specifically relating to volume, degree of technical complexity, cost, precision, reliability, versatility concerning its applications and actuation capacity or available stroke, being an optimal compromise solution between said factors. The mechanism of the device of the invention additionally allows breaking down the reaction force to the support of the pin by means of the presence of intermediate elements, reducing the necessary force of the SMA actuator for moving the activating element.

Therefore, depending on the actuation or displacement direction of the shaft when going from the first to the second position, the invention contemplates that the device is a support element or pin puller, or a pushing element or pin pusher. The device comprises a shaft or pin which, in the case of a pin puller, holds the load until the actuator is activated, concealing the pin inside the device and releasing a payload, exactly opposite the operating mode of the pin pusher.

This solution is comprised in the field of non-explosive deployment mechanisms, which are particularly indicated for applications in which they have to be located in the path of the load, preventing them from being damaged by the explosion of pyrotechnic devices and their high vibration. The solution proposed by the invention in particular is a low shock solution.

The device of the invention does not require special precautions during handling and storage because it does not comprise potentially hazardous elements so it can be stored in normal conditions for long periods.

Unlike pyrotechnic devices, the device of the invention is completely reusable without needing to be disassembled, only one additional action that is either manual or automated with another device being required to reassemble the device with the pin in the first position, either deployed or retracted according to whether it is a pin puller or pin pusher, which facilitates and considerably reduces the costs of testing and rearming operations.

The device of the invention allows the mechanism to withstand high forces and external vibrations, maintaining the pin or shaft in the first position, with the subsequent increase in system reliability.

The possibility of the actuator device comprising a shape memory alloy, commonly referred to as SMA, actuator which can act on the activating element causing its rotation to go from the first to the second position, for example shrinking when it is heated, thus causing the rotation necessary to go from the first to the second position, is contemplated. Said actuator allows the device of the invention to operate at high temperatures.

The use of shape memory alloys in the actuator or initiating element of the device allows it to operate in a broad temperature range and its performance to be adjusted by means of selecting the most appropriate alloy. Furthermore, the dimensions and weight of the device are thus reduced overall because said SMA technology presents the best performance in terms of force performance with minimum weight and volume. Furthermore, said alloys are immune to electromagnetic radiations, no they can be used without problems in noisy environments. Also, unlike electromagnetic solutions, such as motors, shape memory alloys do not generate electromagnetic (EM) noise, so they can be used in clean environments where radiation is limited. With the use of a shape memory alloy, SMA, actuator, with a minimum stroke of the actuator that is able to initiate the device to go from the first to the second position and limited power or force in said actuator considerable movements and force performance in the device as a whole, i.e., in the actuation of the shaft, can be obtained.

The possibility of the linear actuator device comprising at least one fixing element fixed inside the casing and limiting the rotational movement of the activating element is contemplated.

As discussed, it is contemplated that the device is a pin pusher, in which case in the first position of the shaft, said shaft does not project from the casing. It is also contemplated that the device is a pin puller, in which case in the first position of the shaft, said shaft projects from the casing.

DESCRIPTION OF THE DRAWINGS

To complement the description being given and for the purpose of aiding to better understand the features of the invention according to a preferred practical embodiment thereof a set of drawings is attached as an integral part of said description where the following has been depicted with an illustrative and non-limiting character.

PREFERRED EMBODIMENT OF THE INVENTION

Figure 1:
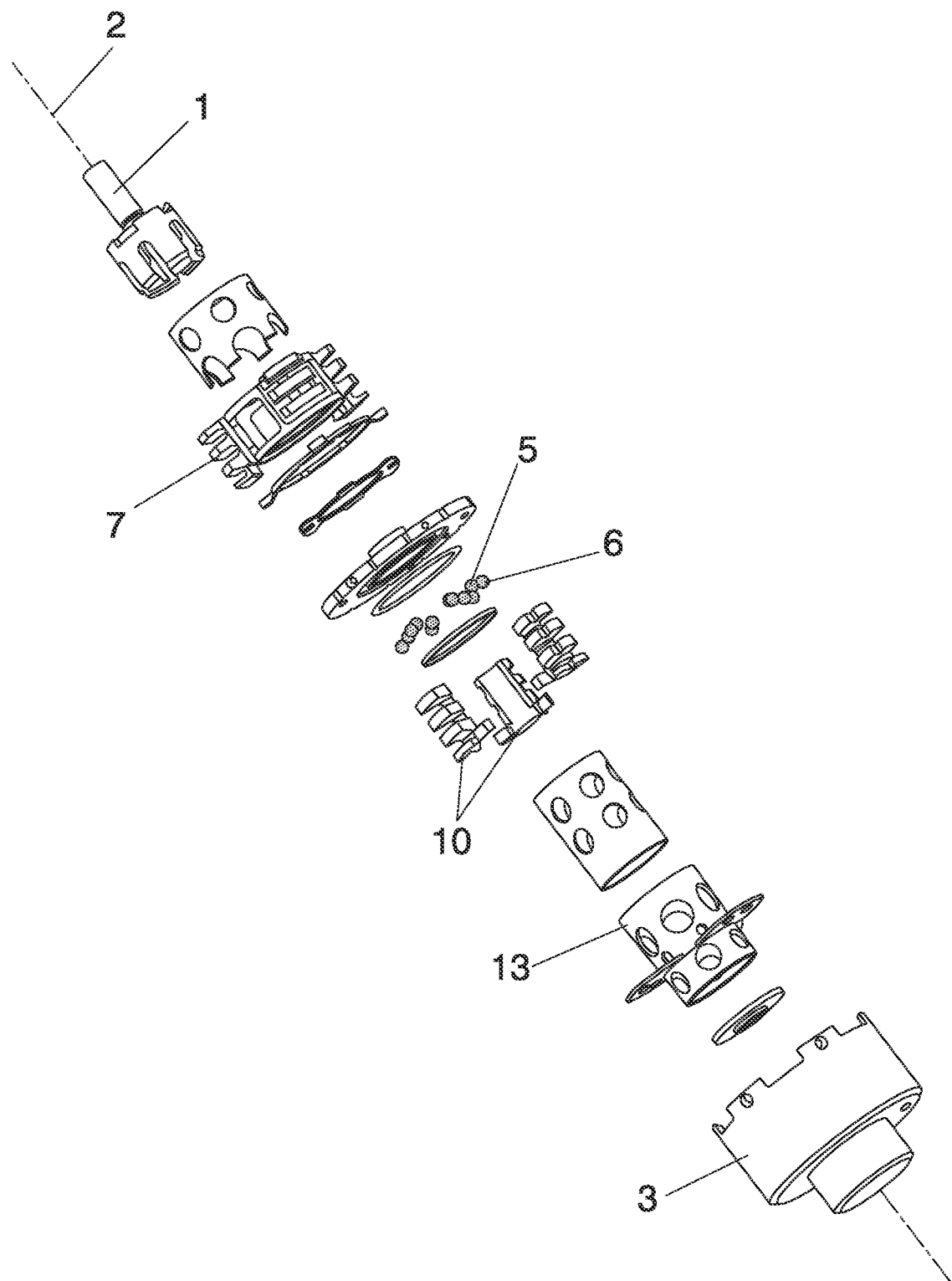
FIG. 1 shows a schematic exploded view of the elements of a first embodiment of the actuator device of the invention, referred to as pin puller.
Figure 2:
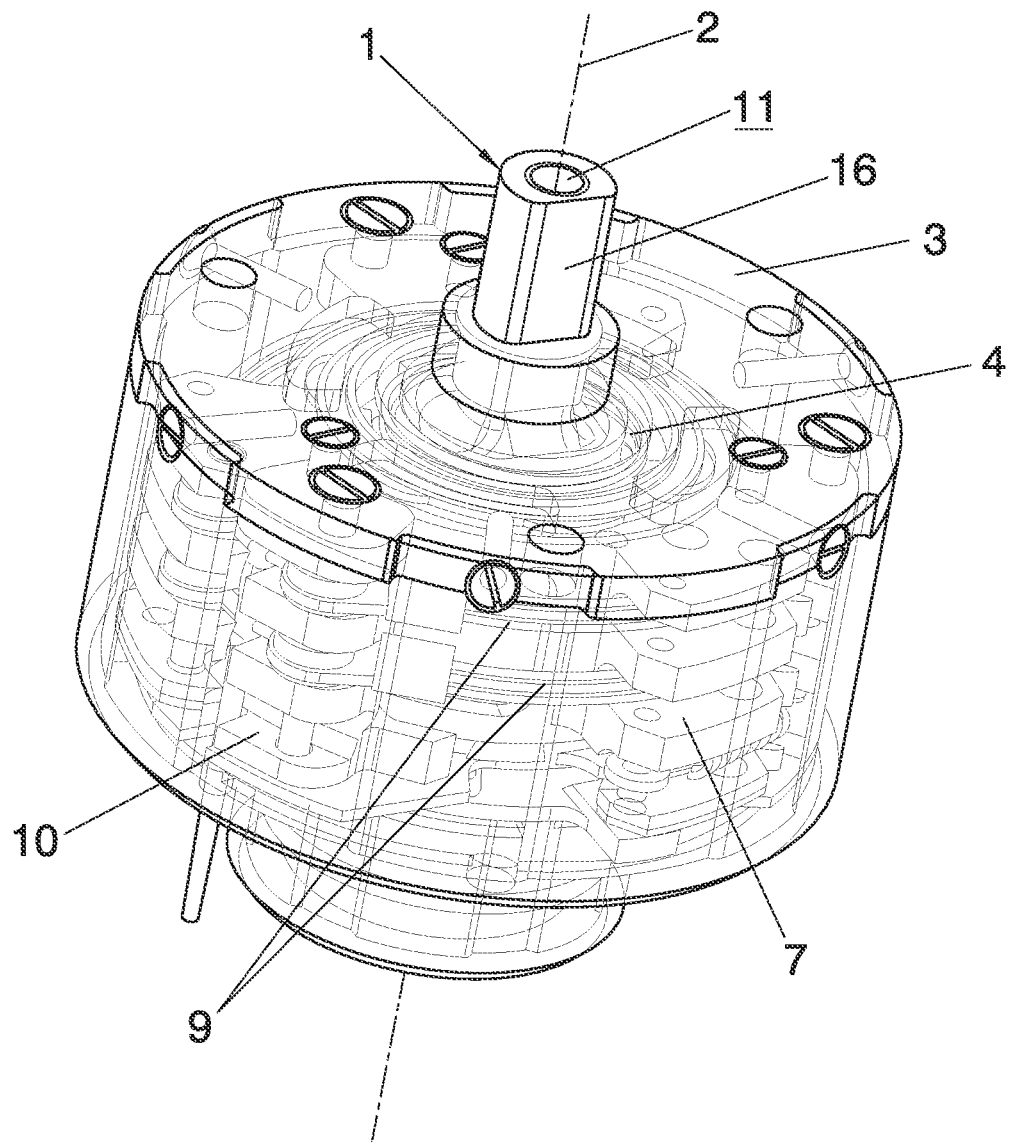
FIG. 2 shows a schematic perspective view of the device depicted in the previous figure, where the casing has been depicted as transparent so that it is possible to see the internal elements of the device, the shaft being located in the first position.
Figure 3:
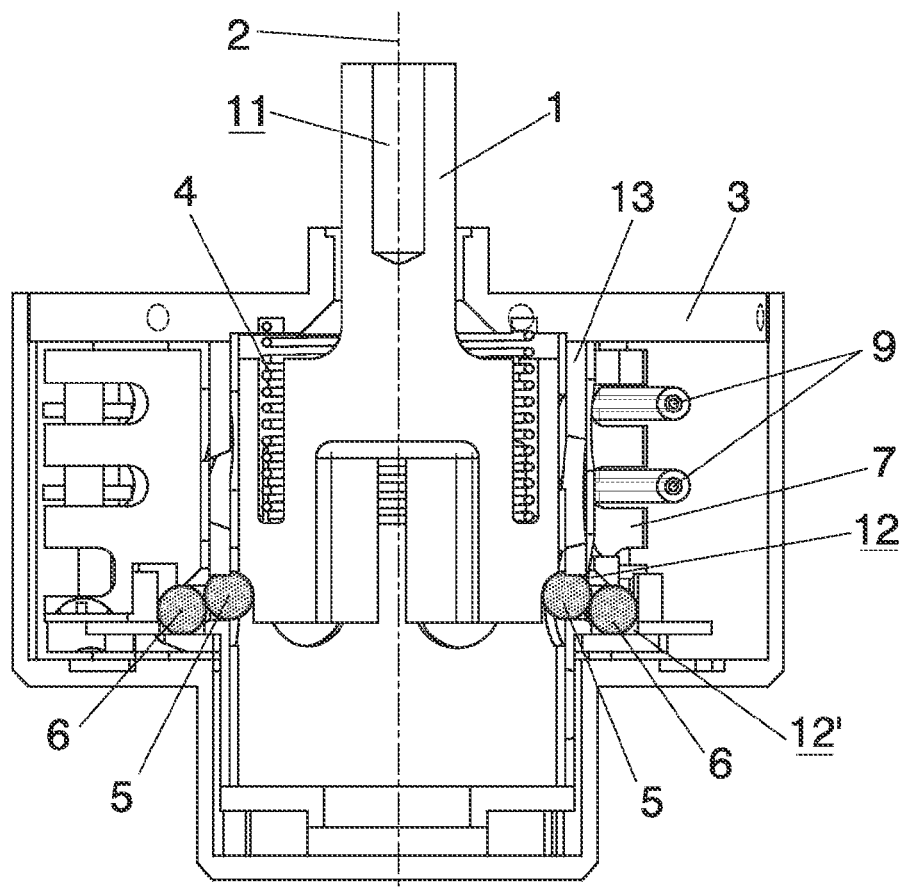
FIG. 3 shows a longitudinal section of the device depicted in the previous figures, likewise in the first position, being able to see the arrangement of the main elements comprised in the device.

In view of the discussed figures, it can be observed how in all the possible embodiments of the invention the linear actuator device proposed by the invention comprises a shaft (1) which is aligned according to an axial direction (2), where said shaft (1) can be displaced with respect to a casing (3), where said shaft (1) is housed at least partially in said casing (3), said displacement being performed by actuating elastic means (4).

As depicted in FIGS. 2, 3, 5, 7, 12, 14, 15, 16 and 18, the shaft (1) can be located in a first position in which it is actuated by the elastic means (4), being maintained immobile in said first position by the contact between said shaft (1) and at least one support element (5) which conveys its load to at least one intermediate element (6) which in turn conveys its load to an activating element (7) according to a direction parallel to the axial direction (2).

Likewise, as depicted in FIGS. 6, 8, 17 and 19 the shaft (1) can be located in a second position in which the activating element (7) is rotated with respect to the axial direction (2) with respect to the casing (3), with respect to its position in the first position of the shaft (1), such that said at least one intermediate element (6) is housed in a housing (8) which the activating element (7) has, allowing the displacement of said at least one support element (5) such that the shaft (1) is not in contact with said at least one support element (5).

According to a preferred embodiment, the actuator device comprises a shape memory alloy actuator (9), commonly referred to as SMA actuator, which can act on the activating element (7) causing its rotation to go from the first to the second position, for example shrinking when it is heated, thus causing the rotation necessary to go from the first to the second position.

On the other hand, a preferred embodiment of the device comprises at least one fixing element (10) fixed inside the casing (3) and limiting the rotational movement of the activating element (7), which is preferably is a crown, said casing (3) preferably having a cylindrical internal configuration.

Likewise, as can be seen in FIGS. 2, 3, 7, 8, 12, 14, 15, 18 and 19 the shaft (1) has an upper hole (11) at its free end which allows gripping the shaft (1) for displacing it from the second to the first position, said upper hole (11) being threaded for example.

According to a first embodiment of the invention depicted in FIGS. 1 to 12, said at least one intermediate element (6) and said at least one support element (5) are in direct contact both in the first and in the second position of the shaft (1), and they have a spherical configuration. Said at least one intermediate element (6) is formed as a plurality of spherical elements in the case depicted, each of which is in contact with a likewise spherical support element (5).

Figure 4:
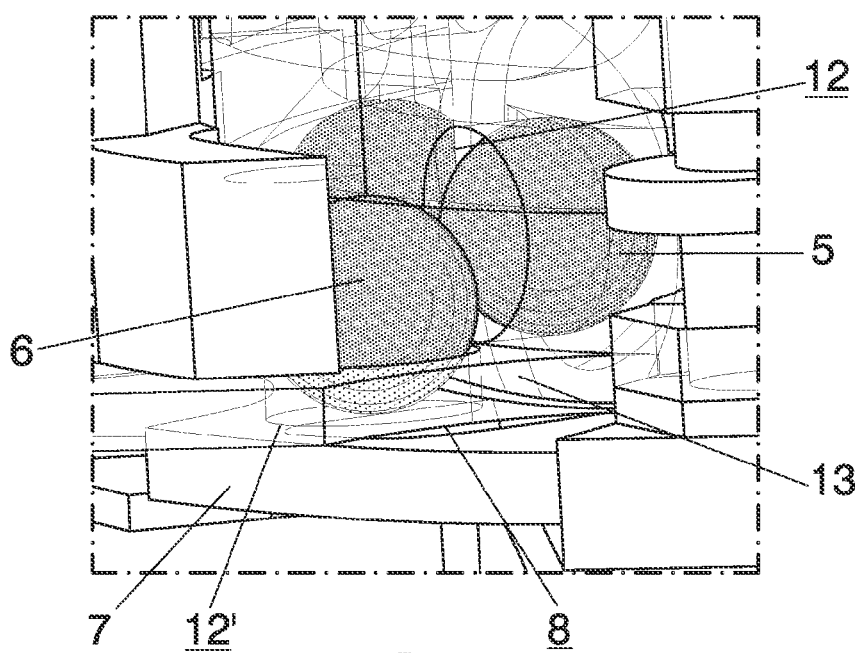
FIG. 4 shows a perspective detail view of a support element in contact with an intermediate element in the first position of device depicted in the previous figures, where in order to see said elements the casing of the device has been depicted as transparent.
Figure 6:
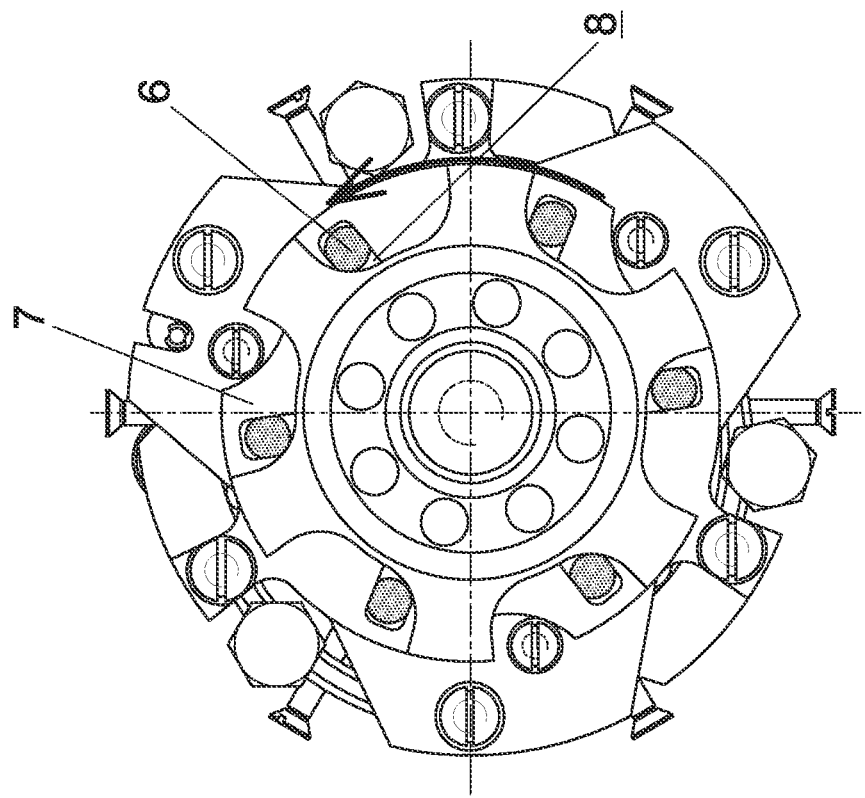
FIG. 6 shows a cross section like that of the previous figure in the second position.
Figure 5:
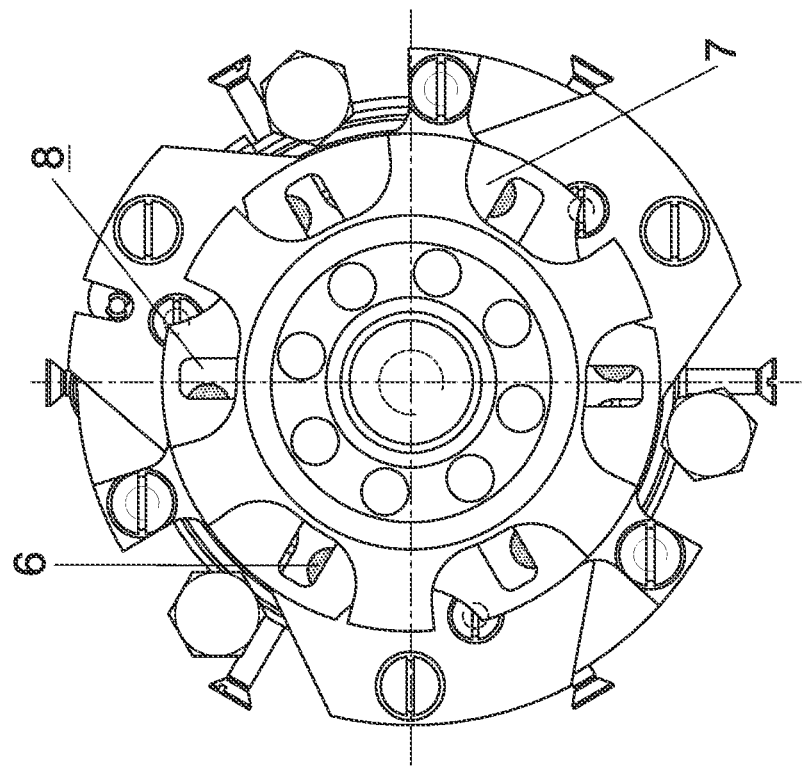
FIG. 5 shows a cross section of the device of the previous figures in an instant prior to going from the first position to the second position.
Figure 7:
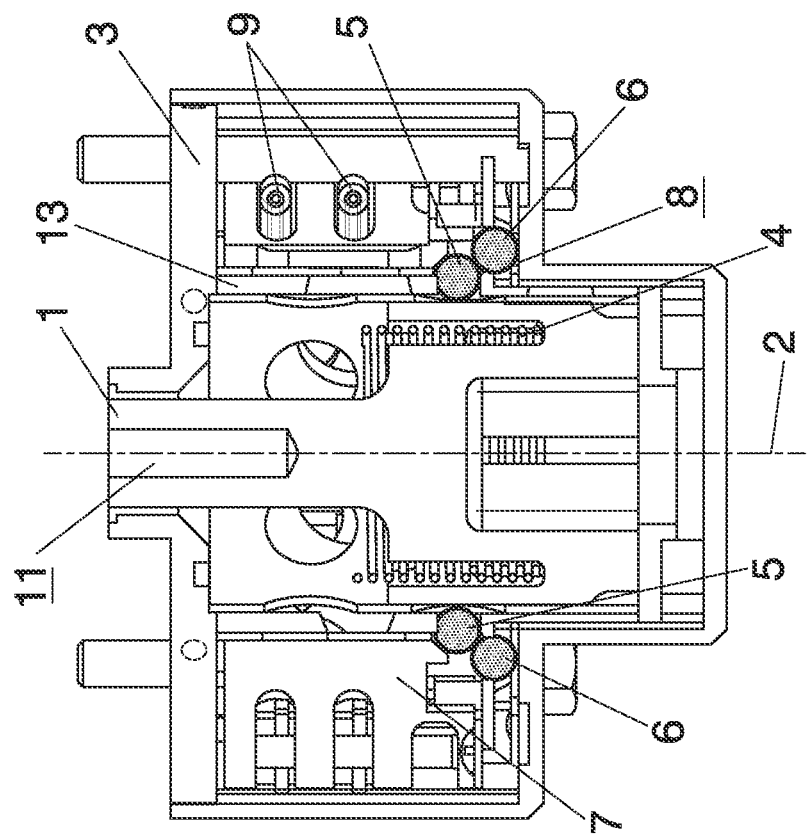
FIG. 7 shows a longitudinal section of the device of the previous figures in the instant depicted in FIG. 5.
Figure 8:
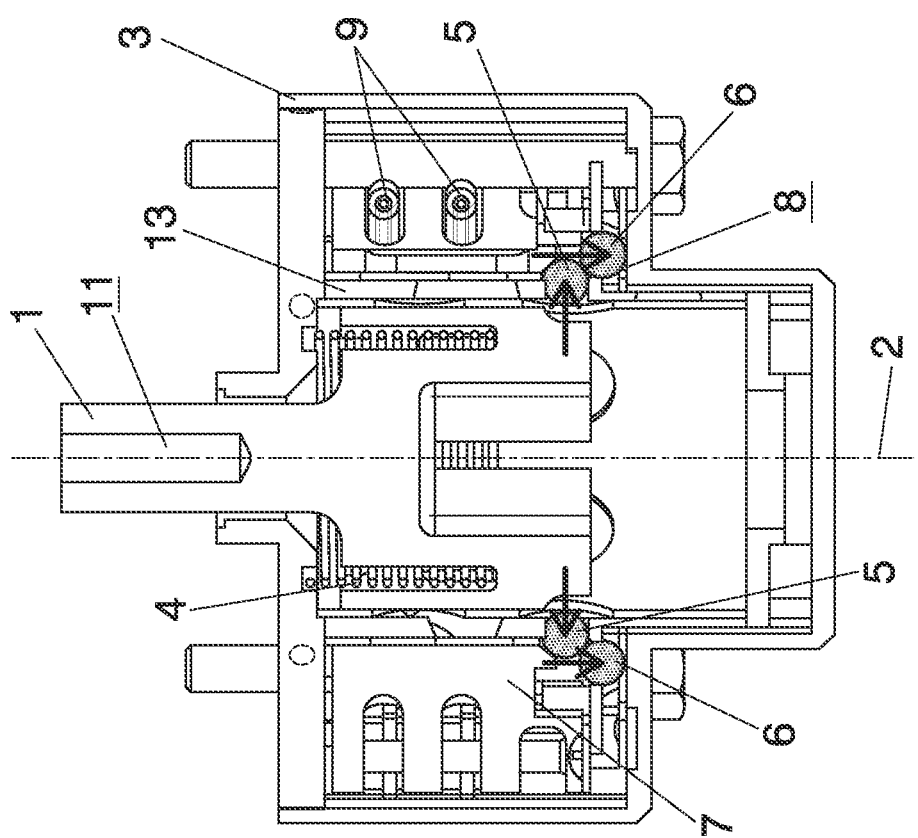
FIG. 8 shows a longitudinal section of the device of the previous figures in the second position, likewise depicted in FIG. 6.
Figure 9:
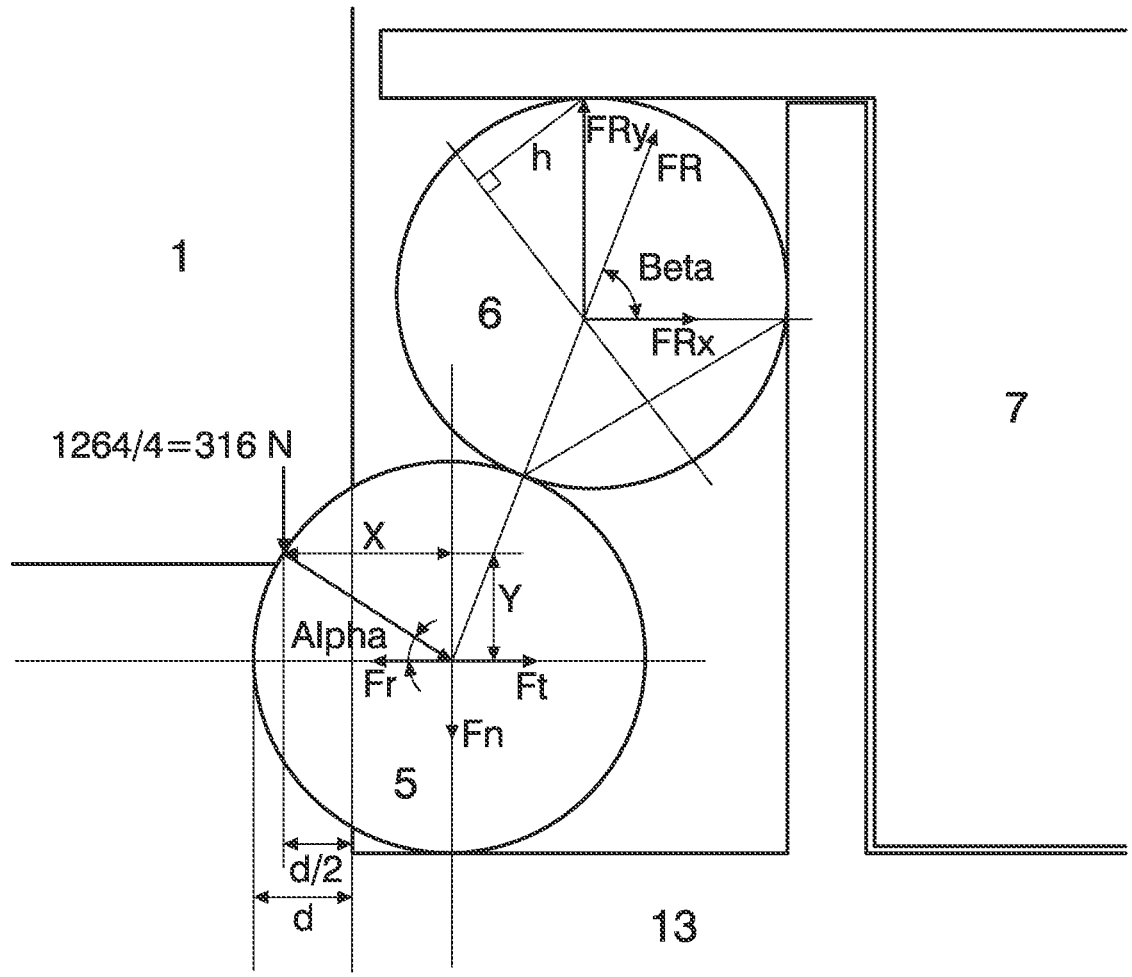
FIG. 9 shows a schematic elevational view of a dynamic diagram of the distribution of forces which takes place in a support element and an intermediate element in the device of the previous figures when it is located in the first position.
Figure 10:
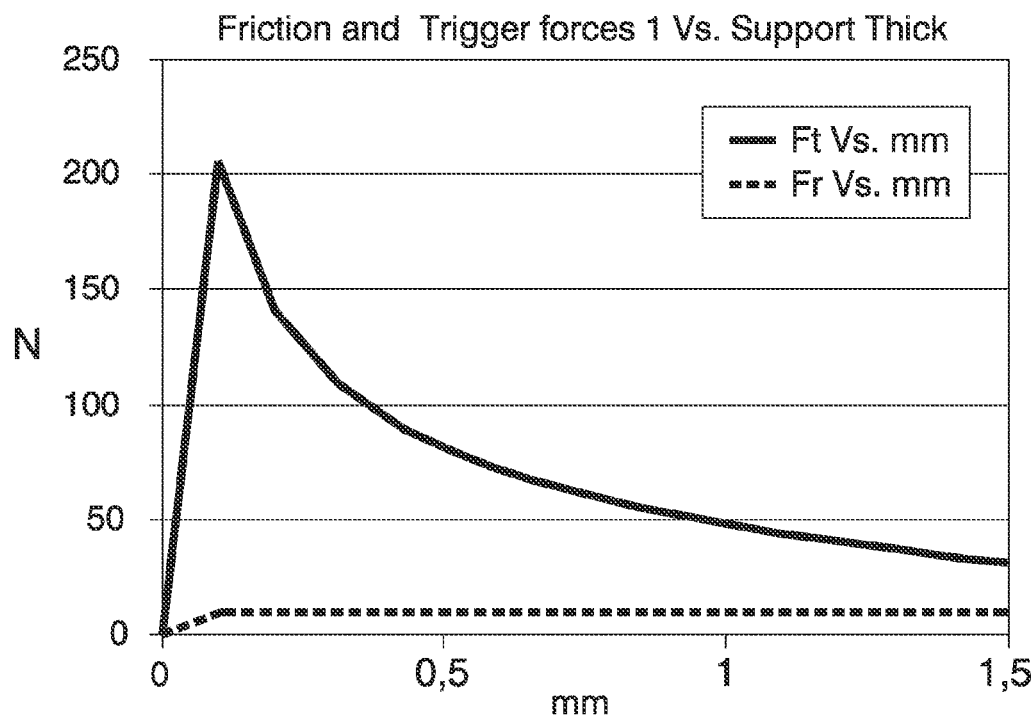
FIG. 10 shows a graph in which two curves relating to the reaction forces are shown, the upper curve relating to the activating element and the lower curve relating to friction in the support elements, depending on the thickness of the support element.
Figure 11:
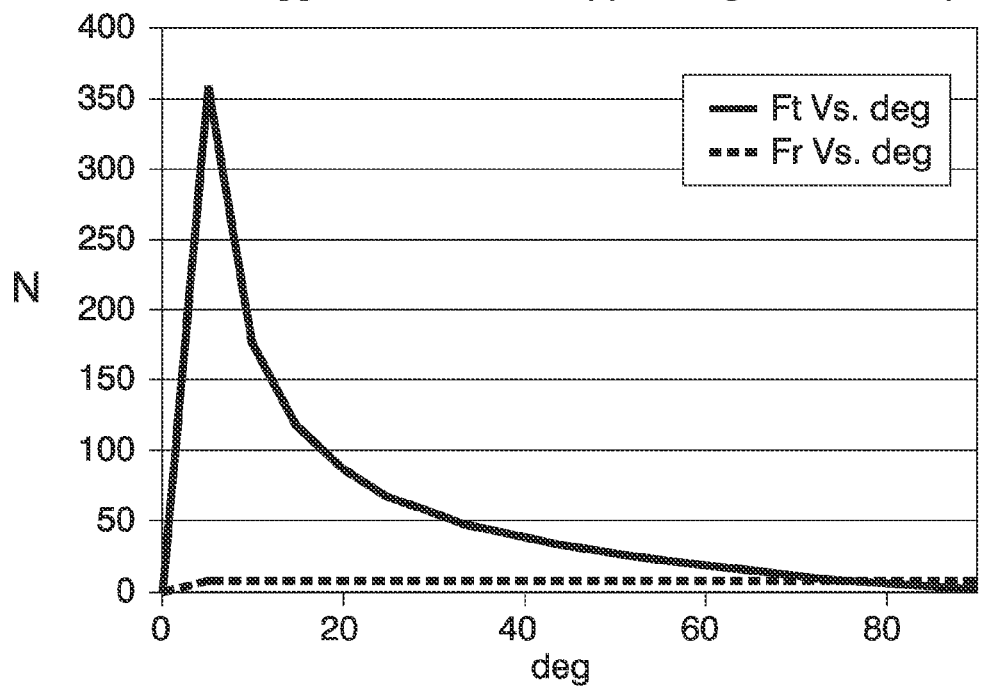
FIG. 11 shows a graph in which two curves relating to the reaction forces are shown, the upper curve relating to the activating element and the lower curve relating to friction in the intermediate elements, depending on the angle between the intermediate element and the support element.

In said first embodiment, each intermediate element (6) and each support element (5) are housed in holes (12, 12') having an alignment element (13) which is located inside the casing (3), such that said holes (12, 12') of the alignment element (13) allow the guided displacement of each intermediate element (6) and support element (5). As can be seen in the detail of FIG. 4, each support element (5) can be housed in a first hole (12) and each intermediate element (6) can be housed in a second hole (12').

Figure 12:
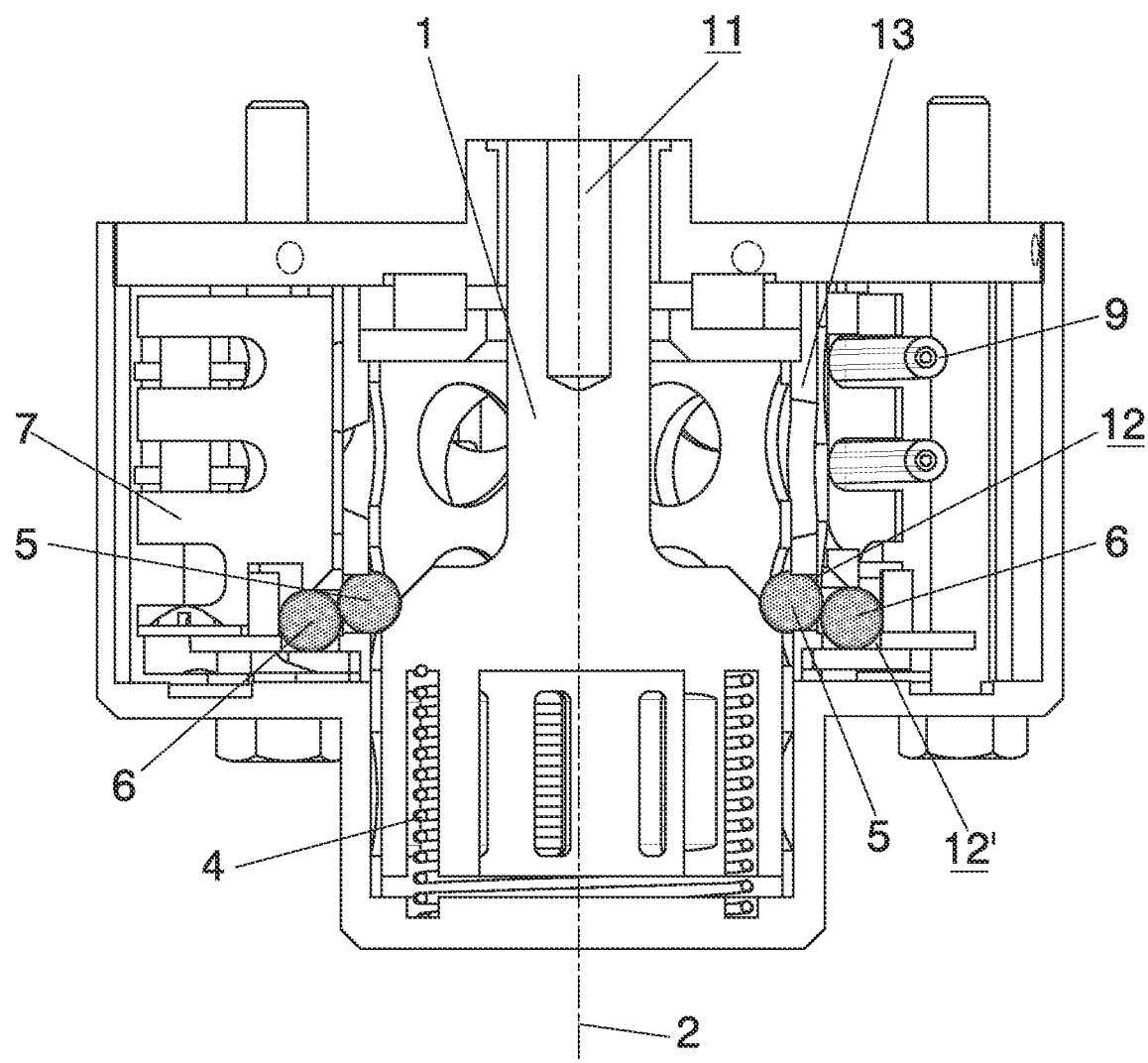
FIG. 12 shows a longitudinal section of a second embodiment of the actuator device of the invention, referred to as pin pusher, which basically comprises the same elements as the first embodiment depicted in the previous figures, having an opposite actuation direction, i.e., in which the first and second position are inverted with respect to the first embodiment, the device being depicted in the first position.
Figure 13:
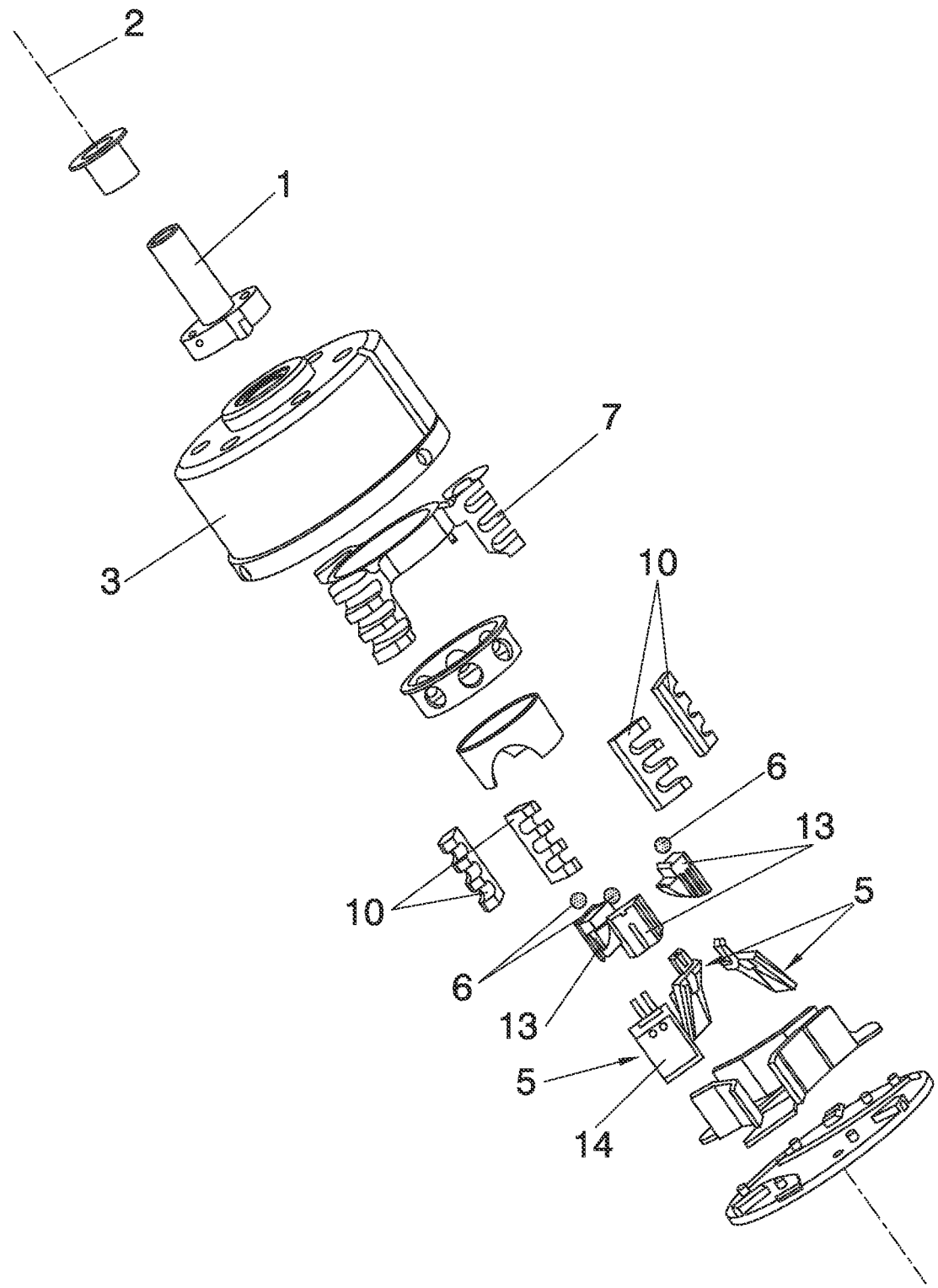
FIG. 13 shows a schematic exploded view of the elements of a third embodiment of the actuator device of the invention which, like the first embodiment, is referred to as a pin puller, having the same actuation direction as said first variant.
Figure 14:
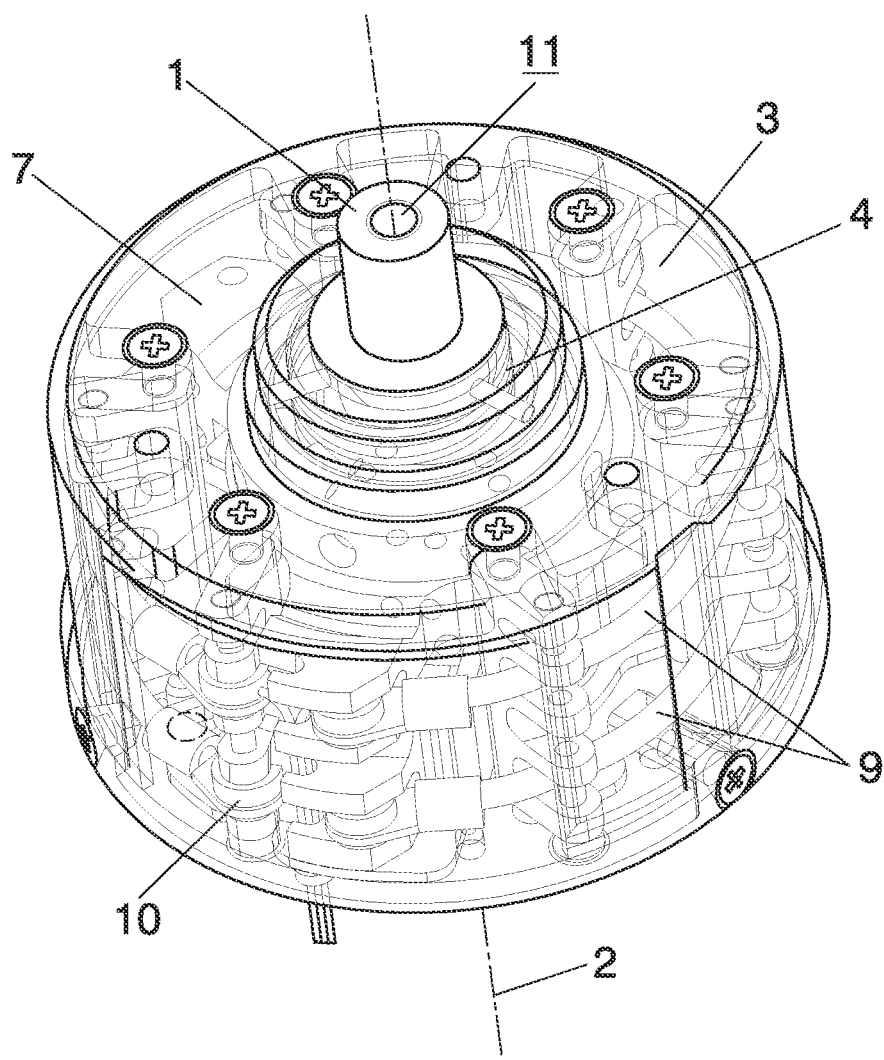
FIG. 14 shows a schematic perspective view of the device depicted in the previous figure where the casing has been depicted as transparent so that it is possible to see the internal elements of the device, the shaft being located in the first position.
Figure 15:
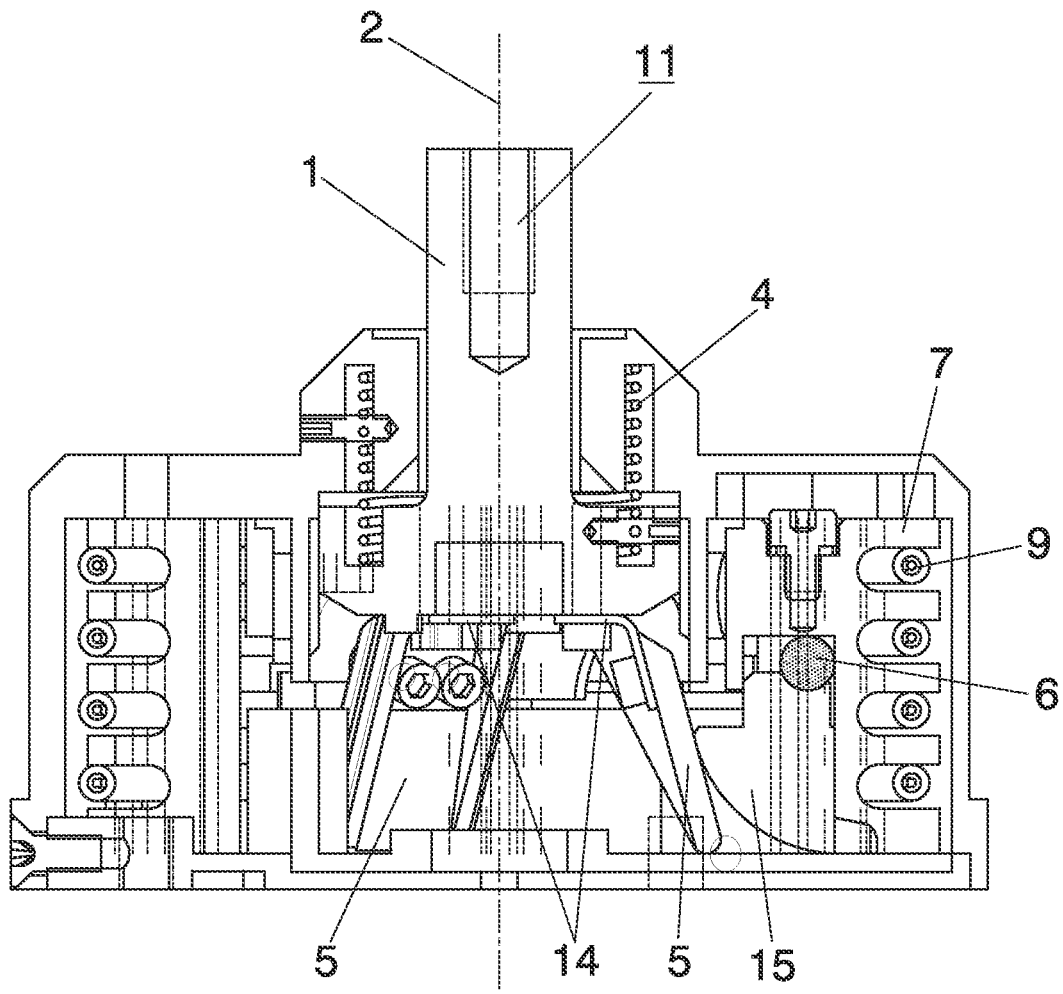
FIG. 15 shows a longitudinal section of the device depicted in FIGS. 13 and 14, likewise in the first position, being able to see the arrangement of the main elements comprised in the device.
Figure 17:
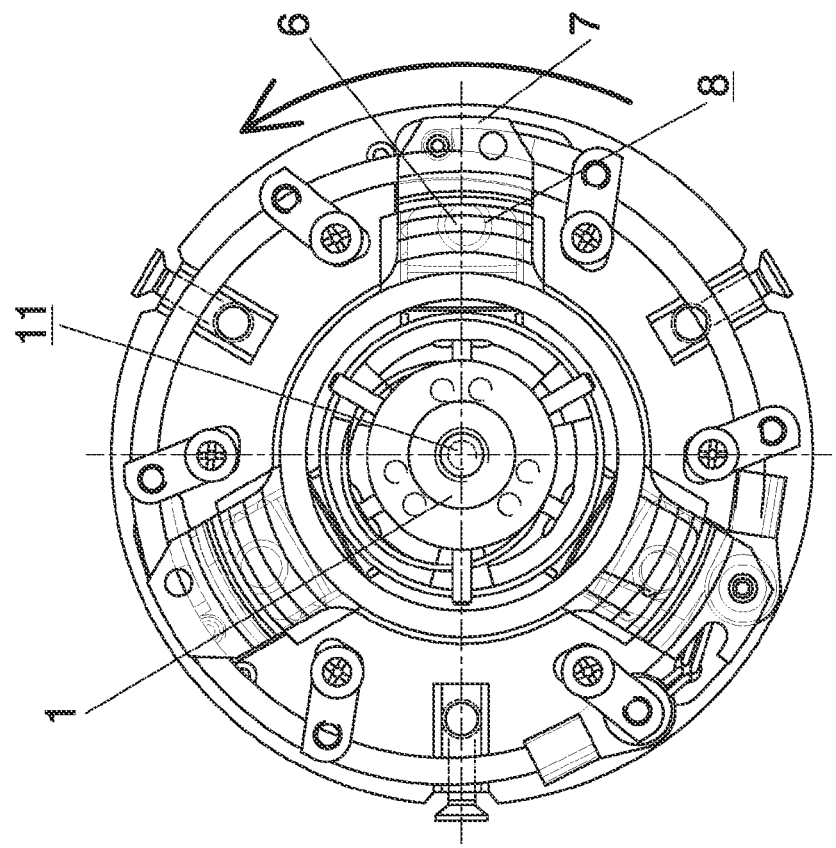
FIG. 17 shows a cross section like that of the previous figure in the second position.
Figure 16:
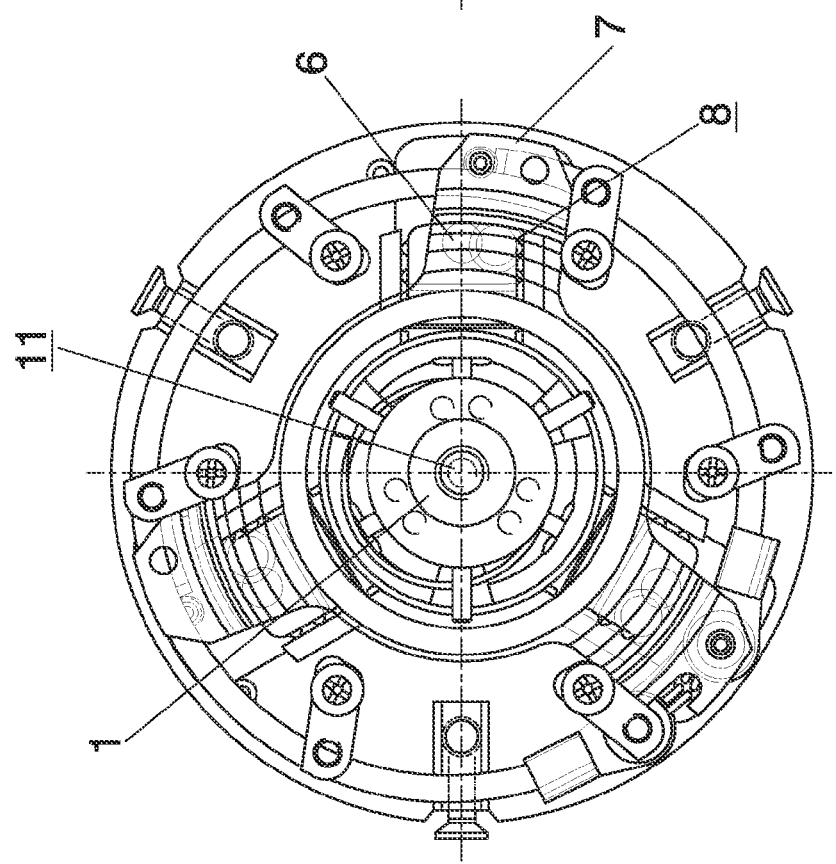
FIG. 16 shows a cross section of the device of FIGS. 13 to 15 in an instant prior to going from the first position to the second position.
Figure 18:
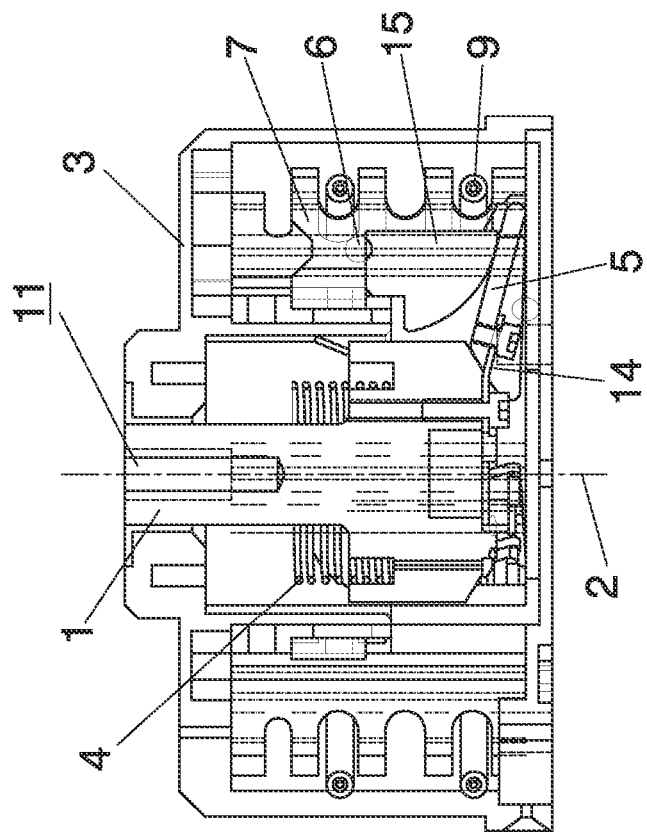
FIG. 18 shows a longitudinal section of the device of FIGS. 13 to 17 in the instant depicted in FIG. 16.
Figure 19:
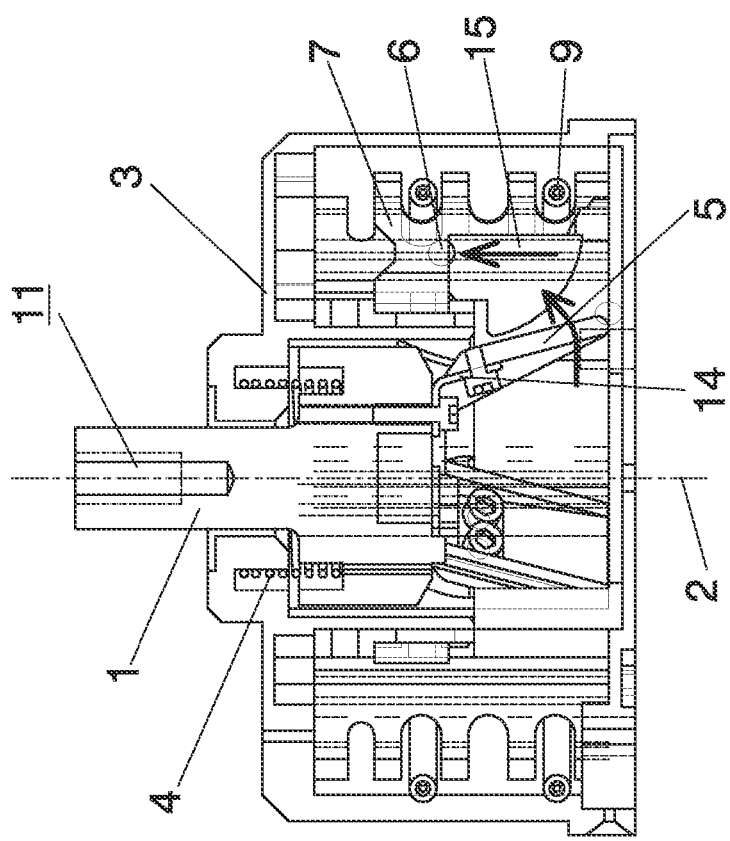
FIG. 19 shows a longitudinal section of the device of FIGS. 13 to 18 in the second position, likewise depicted in FIG. 17.

Within this first embodiment, FIGS. 1 to 11 depict a first variant in which the device is a pin puller, whereas FIG. 12 depicts a second variant in which the device is a pin pusher, equally applying all the elements to their operation and differing only by the position of the shaft (1) and by the arrangement of the elastic means (4) to define the actuation direction. In both cases, the pin (1) is supported on spheres (5) which withstand the axial force applied both externally and by the actuator spring (4). The spheres (5) are locked by contact with an activating element (7) that can rotate, which represents the initiator of the mechanism, which is actuated by a shape memory alloy (SMA) actuator (9) and rotates, causing the spheres (5) to be displaced to go from the first position to the second position. The contact force between the activating element (7) and the spheres (5) is tangential to the axial forces conveyed by the shaft (1), so forces external to the device are greatly isolated, which results in considerable reliability performance even in high load conditions. Furthermore, the use of two redundant actuators (9) assures operation of the device in the event that one fails.

This first variant of the first embodiment, FIGS. 1 to 11 is a mechanical device in which an activating element makes a shaft (1), pin or piston retract inside a casing (3). Usually in the first extended position, the pin (1) is used to prevent the release of an external appendage or element or device. In the extended position, the pin (1) is loaded by a compression spring (4), being maintained locked in its position by the mechanical contact of elements. The compression spring (4) is housed in housings or grooves which both the pin and the upper part of the base have, which allows reducing the longitudinal dimensions of the device.

The device is manually reset by displacing the shaft (1) outwards to the extended position, threading a screw on the upper thread (11) of the shaft (1). The contact forces between pin (1) and spheres (5) are parallel to the longitudinal axis of the pin puller, producing a reaction movement in the sphere (5) in the radial direction. The pin (1) is retracted when the crown (7) rotates due to the action of pulling on the SMA actuator (9). A movable end of the SMA actuator (9) is connected to the crown (7) whereas the other fixed end is connected to the fixing part (10) which is in turn fixed to the casing (3); when the SMA actuator (9) is heated it shrinks, causing a relative rotational movement between the crown (7) and the casing (3). The fixing parts (10) also serve to increase the rigidity of the structure.

With this first variant forces are conveyed from the pin (1) through isolated contacts which assure that the pin (1) does not shrink due to forces or vibrations that are axial or tangential to the device. Therefore, there are no flat surfaces subjected to stresses that are in contact with one another, so adhesion between them is reduced and activation of the mechanism through the initiating actuator (9) based on shape memory alloys is facilitated.

On the other hand, according to a second embodiment of the invention depicted in FIGS. 13 to 22, said at least one intermediate element (6) has a spherical configuration and said at least one support element (5) comprises a rigid element which is attached to the shaft (1) by means of a deformable element (14), such that said at least one support element (5) conveys its load to said at least one intermediate element (6) through a support part (15).

This second variant of the device, which has only been depicted for the case of a pin puller although it is likewise contemplated for a pin pusher by reversing the arrangement of its elements to invert the actuation direction, allows the mechanism to withstand high forces and external vibrations, maintaining the pin (1) deployed, with the subsequent increase in system reliability. The pin (1) is supported in support elements (5) formed as rigid bars which withstand the axial force applied both externally and by the actuator spring (4), which works in the same way as in the case of the first variant, under compression. The bars (5) are locked by contact with a plurality of intermediate support elements (6), preferably six, which have a spherical configuration which in turn are locked by contact with the rotatable activating element (7) representing the initiator of the mechanism which is actuated by a shape memory alloy (SMA) actuator (9) and rotates, causing the supports and the bars (6) to be sequentially displaced.

Figure 20:
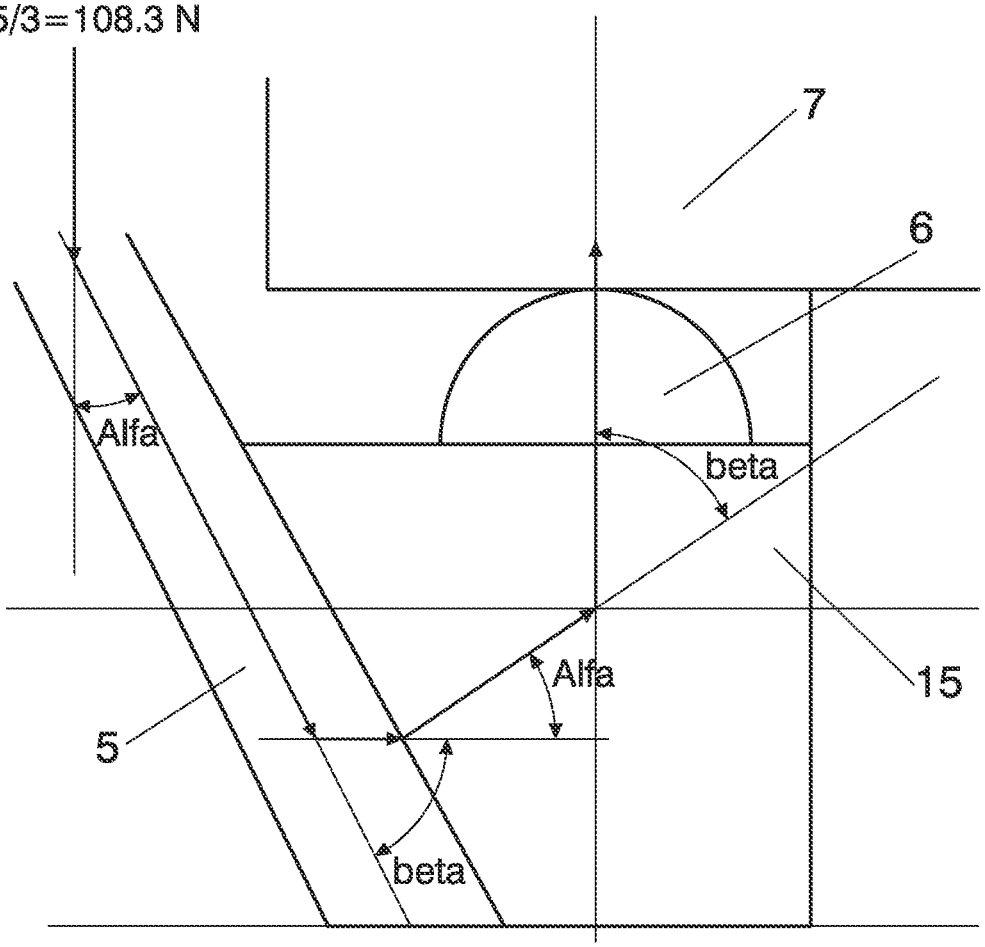
FIG. 20 shows a schematic elevational view of a dynamic diagram of the distribution of forces which takes place in a support element and an intermediate element in the device of FIGS. 13 to 19 when it is located in the first position.
Figure 21:
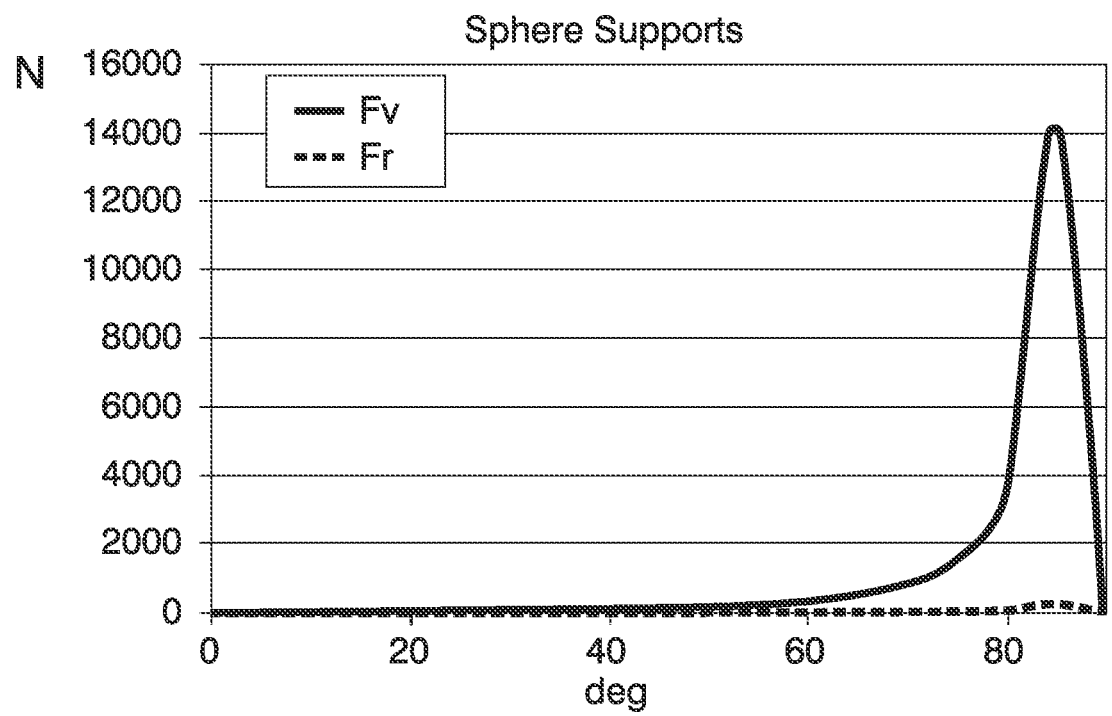
FIG. 21 shows a graph in which two curves relating to the reaction forces in the intermediate elements depending on the angle of the support element are shown.
Figure 22:
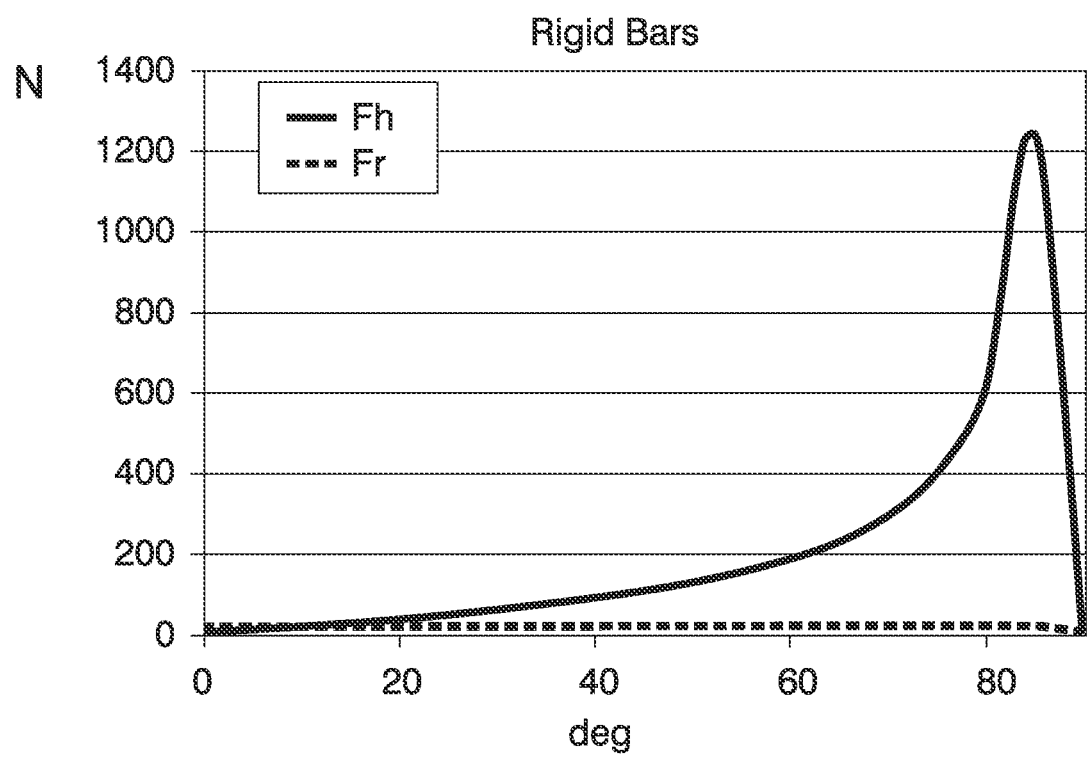
FIG. 22 shows a graph in which two curves relating to the reaction forces in the support parts depending on the angle of the support element are shown.

As depicted in the diagram of FIG. 20, the contact force between the rigid bars and the supports is applied in a shaft forming an angular component with respect to that tangential to the axial forces conveyed by the shaft (1), so forces external to the device are greatly isolated, which results in considerable reliability performance even in high load conditions. Furthermore, the use of two redundant actuators (9) assures operation of the device in the event that one fails.

The rigid bars supporting the shaft (1) are attached thereto by means of flexible or deformable elements (14) which allow the rotational displacement thereof during the translation of the shaft (1), reducing the eventual friction generated by the rotary joints. Likewise, said flexible elements (14) allow positioning the bars in their initial position while reinitiating the mechanism. The flexible elements (14) represent passive elements that absorb energy; for this reason said elements will absorb part of the shock energy generated while actuating the shaft (1). Therefore, the invention is an ultra-low shock solution.

As seen in the figures, the second embodiment of the device comprises several support elements (5) formed as rigid bars supporting the shaft (1) and keeping it deployed in the first, initial position. Four deformable elements (14) or flexible bars join the rigid bars and the shaft (1), acting as flexible rotary or revolute, joints for the rotation of the rigid bars. These deformable elements (14) can be made from shape memory alloy SMA working in its super-elastic configuration, such that they exert constant force to recover their original configuration when they are bent or flexed. Another option is to use elastic materials to make the joints or deformable elements (14). Once the rigid bars are released, the flexible bars (14) open them, thus allowing the shaft (1) to enter the casing (3). The flexible bars (14) allow rotation with low friction of the rigid bars in a broad range. As in the first embodiment, the operation is based on the rotational movement of the crown or activating element (7), in turn moved by the shape memory alloy (SMA) actuator (9) and intermediate elements (6) formed as spheres locking the stroke of the shaft (1). Several spheres (6) lock the rigid bars at a wide angle in the initial position, thus creating contact forces that try to push the spheres (6) upwards. Additionally, the spheres (6) are in contact with the crown (7) locking the upward movement reaction. When the SMA actuator (9) is heated, the crown (7) rotates, pulled by the SMA (9), lining up the holes (12') or grooves of the crown (7) with the spheres (6). When the spheres (6) are lined up with the holes (12') they allow the upward reaction movement of the spheres (6), thus allowing the shaft (1) to enter the structure. Two channels on the lower face of the crown (7) guide the rigid bars during the stroke. Reinitiating is done by pulling with a threaded element (11) from the upper part of the shaft (1), as in the case of the first embodiment, being able to comprise, like said first embodiment, shaft (1) position sensors.

The flexible elements (14) allow the support elements (5) or legs to retract when the shaft (1) is introduced with very little friction, so ultra-low shock is achieved during deployment due to the damping of the flexible elements (14).

In both cases, the shaft (1) has at least one flat surface (16) preventing unwanted rotation of the shaft (1) as a consequence of an external action, i.e., preventing a rotation momentum from being produced therein that entails the unwanted activation of the mechanism, which prevents the mechanism from being accidentally released as a consequence of the action of an external force.

Therefore, depending on the actuation or displacement direction of the shaft when going from the first to the second position, the invention contemplates that the device is a support element or pin puller, depicted in all the figures with the exception of FIG. 12, or a pushing element or pin pusher, depicted in FIG. 12. The device comprises a shaft or pin which, in the case of a pin puller, holds the load until the actuator is activated, concealing the pin inside the device and releasing a payload, exactly opposite the operating mode of the pin pusher.

When the device is a pin pusher, in the first position of the shaft (1) said shaft (1) does not project from the casing (3), whereas when the device is a pin puller, in the first position of the shaft (1) said shaft (1) projects from the casing (3).

In view of this description and set of drawings, the person skilled in the art will understand that the described embodiments of the invention can be combined in many ways within the subject matter of the invention. The invention has been described according to preferred embodiments thereof, but for a person skilled in the art it will be obvious that multiple variations can be introduced in said preferred embodiments without exceeding the subject matter of the claimed invention.

The invention claimed is:

1. A linear actuator device comprising a shaft (1), which is aligned according to an axial direction (2), which is displaceable with respect to a casing (3) in which the shaft is housed at least partially, by actuating elastic means (4), characterized in that the shaft (1) when located in a first position is actuated by the elastic means (4), being maintained immobile in said first position by the contact between said shaft (1) and at least one support element (5) which conveys its load to at least one intermediate element (6) which in turn conveys its load to an activating element (7) according to a direction parallel to the axial direction (2); the shaft (1) being able to be located in a second position in which the activating element (7) is rotated with respect to the axial direction (2) with respect to the casing (3), with respect to the position thereof in the first position of the shaft (1), such that said at least one intermediate element (6) is housed in a housing (8) which the activating element (7) has, allowing the displacement of said at least one support element (5) such that the shaft (1) is not in contact with said at least one support element (5), further comprising an actuator made of a shape memory alloy (9) which acts on the activating element (7) to rotate the activating element (7) from the first to the second position.

2. The linear actuator device according to claim 1, comprising at least one fixing element (10) fixed inside the casing (3) and limiting the rotational movement of the activating element (7).

3. The linear actuator device according to claim 1, wherein the activating element (7) is a crown.

4. The linear actuator device according to claim 1, wherein the casing (3) has a cylindrical internal configuration.

5. The linear actuator device according to claim 1, wherein the shaft (1) has an upper hole (11) at a free end thereof which allows gripping and displacing the shaft (1) from the second to the first position.

6. The linear actuator device according to claim 1, wherein said at least one intermediate element (6) and said at least one support element (5) are in direct contact, both in the first and in the second position of the shaft (1), and have a spherical configuration.

7. The linear actuator device according to claim 1, wherein said at least one intermediate element (6) and said at least one support element (5) are housed in holes (12, 12') having an alignment element (13) which is located inside the casing (3), such that said holes (12, 12') of the alignment element (13) allow the guided displacement of said at least one intermediate element (65 and support element (5).

8. The linear actuator device according to claim 1, wherein the shaft (1) has at least one flat surface (16) preventing unwanted rotation of the shaft (1) as a consequence of an external action.

9. The linear actuator device according to claim 1, wherein the first position of the shaft (1) said shaft (1) projects from the casing (3).

10. The linear actuator device according to claim 1, comprising at least one fixing element (10) fixed inside the casing (3) and limiting the rotational movement of the activating element (7).

11. The linear actuator device according to claim 10, wherein the activating element (7) is a crown.

12. The linear actuator device according to claim 11, wherein the casing (3) has a cylindrical internal configuration.

13. The linear actuator device according to claim 12, wherein the shaft (1) has an upper hole (11) at a free end thereof which allows gripping and displacing the shaft (1) from the second to the first position.

14. The linear actuator device according to claim 13, wherein said at least one intermediate element (4) and said at least one support element (5) are in direct contact, both in the first and in the second position of the shaft (1), and have a spherical configuration.

15. The linear actuator device according to claim 14, wherein said at least one intermediate element (6) and said at least one support element (5) are housed in holes (12, 12°) having an alignment element (13) which is located inside the casing (3), such that said holes (12, 12') of the alignment element (13) allow the guided displacement of said at least one intermediate element (6) and support element (5).

* * * * *